United States Patent [19]
Dodt et al.

[11] Patent Number: 5,202,809
[45] Date of Patent: Apr. 13, 1993

[54] MAGNETIC TAPE CARTRIDGE FOR HELICAL SCAN TRANSPORTS WITH A SINGLE REEL

[75] Inventors: William C. Dodt, Broomfield; Donald F. McCarthy, Westminster, both of Colo.

[73] Assignee: Storage Technology Corporation, Louisville, Colo.

[21] Appl. No.: 699,143

[22] Filed: May 13, 1991

[51] Int. Cl.$^5$ .......................................... G11B 23/027
[52] U.S. Cl. ...................................... 360/132; 360/95
[58] Field of Search ........................... 360/132, 95, 85; 242/195

[56] References Cited

U.S. PATENT DOCUMENTS

| | | | |
|---|---|---|---|
| 4,432,508 | 2/1984 | Inoue et al. | 242/195 |
| 4,987,504 | 1/1991 | Inoue | 360/95 |
| 5,034,842 | 7/1991 | Turgeon | 360/132 |
| 5,128,815 | 7/1992 | Leonhardt et al. | 360/95 |

FOREIGN PATENT DOCUMENTS 2353823 5/1974 Fed. Rep. of Germany ...... 242/195

Primary Examiner—David J. Severin
Attorney, Agent, or Firm—Duft, Graziano & Forest

[57] ABSTRACT

This system makes use of a tape cassette helical scan tape transport and a modified 3480-type magnetic tape cartridge as the data storage media. The merging of these two incompatible elements is accomplished by the use of a novel interface that implements a "virtual tape cassette" by providing a takeup reel positioned with the magnetic tape cartridge in a relationship that substantially matches the format of a magnetic tape cassette. A short tape threading arm is used to retrieve the leader block from the tape cartridge and thread the magnetic tape over a short tape threading path to the takeup reel. Once the tape is affixed to the takeup reel, the helical scan tape loading mechanism transports the length of tape that is now exposed between the tape cartridge and the takeup reel to the rotary heads. The helical scan magnetic tape cartridge has the same exterior dimensions as a conventional 3480-type magnetic tape cartridge but is implemented in the inverse configuration. In particular, the magnetic tape is wound counterclockwise around the cartridge spindle, with the recording surface of the magnetic tape facing out and the magnetic tape exiting the left corner of the cartridge (when viewed from the top). In addition, the right front corner of the cartridge may be angled to further distinguish the helical scan magnetic tape cartridge from the conventional 3480-type magnetic tape cartridge.

11 Claims, 4 Drawing Sheets

MAGNETIC TAPE CARTRIDGE FOR HELICAL SCAN TRANSPORTS WITH A SINGLE REEL

CROSS REFERENCE TO RELATED APPLICATIONS

This patent application is related to U.S. patent application Ser. No. 07/611,922, filed Nov. 9, 1990 and titled "Cartridge Tape System for Helical Scan Transports".

FIELD OF THE INVENTION

This invention relates to helical scan tape transports and, in particular, to a unique magnetic tape cartridge and apparatus that adapts a tape cassette helical scan tape transport to the use of tape cartridges.

PROBLEM

Computer system tape transports typically make use of the IBM 3480-type magnetic tape cartridges as the data storage media. The 3480-type magnetic tape cartridge is a single reel tape cartridge which has a leader block attached to one end of the tape. The tape transport mechanism threads the leader block end of the magnetic tape over a predetermined path to a takeup reel. The tape path includes a plurality of bearings for guiding the tape and a read/write head assembly. The takeup reel includes a slot for receiving the leader block and is connected to an associated drive mechanism which transports the tape between the takeup reel and the tape cartridge.

In order to follow the complex tape threading path, a jointed tape threading arm is provided. A cam track is also provided to guide the tape threading arm and is located over the tape threading path. The cam track has a beginning point for positioning a longitudinal cam member into engagement with the magnetic tape leader block which is exposed through an opening in the tape cartridge. The tape threading arm is connected at one end to the longitudinal cam member and at the other end to a servo controlled drive motor. The drive motor activates the tape threading arm to transport the longitudinal cam member from the end of the cam track, where it engages the leader block, to a slot in the takeup reel, threading the magnetic tape through the tape threading path as it traverses this path. Due to the complex nature of this tape threading path, a complicated servo mechanism is included in the drive circuit in order to pull the tape at a constant speed and provide a constant tension on the tape as it is being withdrawn from the tape cartridge and transported to the takeup reel.

An alternative to the 3480-type tape cartridge is a tape cartridge design which used in place of a leader block, an elongated stiff member (leader tape) wider than the associated magnetic tape and attached to the end thereof for tape threading purposes. This stiff leader tape fits into a slotted tape threading track which follows a complex tape threading path around the associated rotary heads to the takeup reel. As the leader tape traverses the entirety of this complex tape threading path, the narrower magnetic tape is also pulled through the tape threading path and physically wrapped around the rotary head. This tape transport apparatus was used to read and write video signals on the magnetic tape in helical scan format but suffered from the complexity of the tape threading path and the need for a long stiff leader tape member attached to the end of the magnetic tape, which must be pushed through the tape threading path by the unwinding action of the tape cartridge reel.

An alternative helical scan data storage arrangement uses a magnetic tape format that consists of a two reel tape cassette. In one application, the two reel cassette placed the reels coaxially, one over the other, and provided an angled tape path within the tape cassette between the two reels to transport the tape between the two reels. A window is provided in the front of the cassette so that a tape threading mechanism could access a length of tape to retrieve it from within the tape cassette and wrap it around the rotary heads of the helical scan tape transport. A certain amount of complexity was involved in this arrangement since the tape retrieved from the tape cassette is on an angular relationship with the takeup and supply reels and this angular relationship must be maintained as the tape is applied to the rotary head in order to enable the writing of data in helical scan format thereon. Complex tape guide mechanisms were provided in this apparatus in order to maintain the proper angular relationship of the tape to the rotary head.

Another helical scan system is the video cassette recording (VCR) tape transport that makes use of a rotary head and writes data in the form of video images in a helical scan format on the magnetic tape. The VCR mechanism obviates the need for a complex tape positioning apparatus by placing two reels in the tape cassette in a coplanar, juxtaposed relationship. Instead of angling the tape, the rotary head is angled with respect to the coplanar source and takeup reels. In this manner, the tape maintains a coplanar transport relationship with the source and takeup reels and it is the head that is positioned to be at the proper angular relationship with the recording surface of the tape for writing data in the form of video signals in a helical scan format thereon.

The 3480-type tape cartridge has become the data processing industry standard form factor. The helical scan transports are not applicable to the computer data storage environment due to the different tape form factor, even though they have a greater data recording density and data transfer rate then 3480-type media. These tape transports have primarily found use in the video cassette recording technology. Thus, the tape cartridge longitudinal format data storage media and the tape cassette helical scan format data storage media are two diverse technologies with inconsistent requirements.

SOLUTION

The above described problems are solved and a technical advance achieved in the art by the magnetic tape cartridge for a helical scan transport. This helical scan system makes use of a helical scan tape transport and a magnetic tape cartridge that has the exterior dimensions of a 3480-type cartridge as the data storage media. The merging of these two incompatible elements is accomplished by the use of a novel magnetic tape cartridge format and an associated interface that implements a "virtual tape cassette" using a tape cartridge in a manner that makes the media compatible with the tape transport. The virtual tape cassette is implemented by providing a takeup reel positioned with respect to the magnetic tape cartridge in a relationship that substantially matches the format of the magnetic tape cassette required by the associated helical scan drive. A short tape threading arm is used to retrieve the leader block from the tape cartridge and thread the magnetic tape over a short tape threading path to the takeup reel. Once the tape leader block is inserted into the takeup reel, a helical scan tape wrap mechanism transports the length of magnetic tape, that is now exposed between the tape cartridge and the takeup reel, to the rotary heads which are located in a position with respect to the tape cartridge and takeup reel to be compatible with the tape cassette operation of the helical scan transport. This cartridge tape system therefore operates in a two step process: first-threading the magnetic tape from a tape cartridge to a takeup reel to create a virtual tape cassette image, second-transporting the magnetic tape from the virtual tape cassette onto the rotary head of the helical scan tape transport. By use of this two step process, the need for complex tape threading paths is avoided and the computer system compatible 3480-type magnetic tape cartridge form factor can be used in the higher data recording density helical scan tape transport.

This helical scan apparatus makes use of a magnetic tape cartridge that has the same exterior dimensions as the 3480-type magnetic tape cartridge. However, the magnetic tape in this helical scan cartridge is wound in a clockwise direction around the cartridge spindle, with the recording surface of the magnetic tape facing out, and the magnetic tape exiting the left front corner of the cartridge (as viewed from above). This configuration is the inverse of the standard 3480-type magnetic tape cartridge implementation. In addition to this mechanical adaptation of the 3480-type tape cartridge, a helical scan compatible magnetic tape is loaded in the 3480-type cartridge in order to be electrically, magnetically and mechanically compatible with the helical scan tape transport. These adaptations to the 3480-type magnetic tape cartridge enable the helical scan tape drive to be configured such that the cartridge is loaded into the drive in a manner that is identical to conventional 3480-type drives. The reconfiguration of the cartridge also provides the virtual tape cassette image that is required to use a conventional helical scan tape transport.

DETAILED DESCRIPTION

Figure 1:
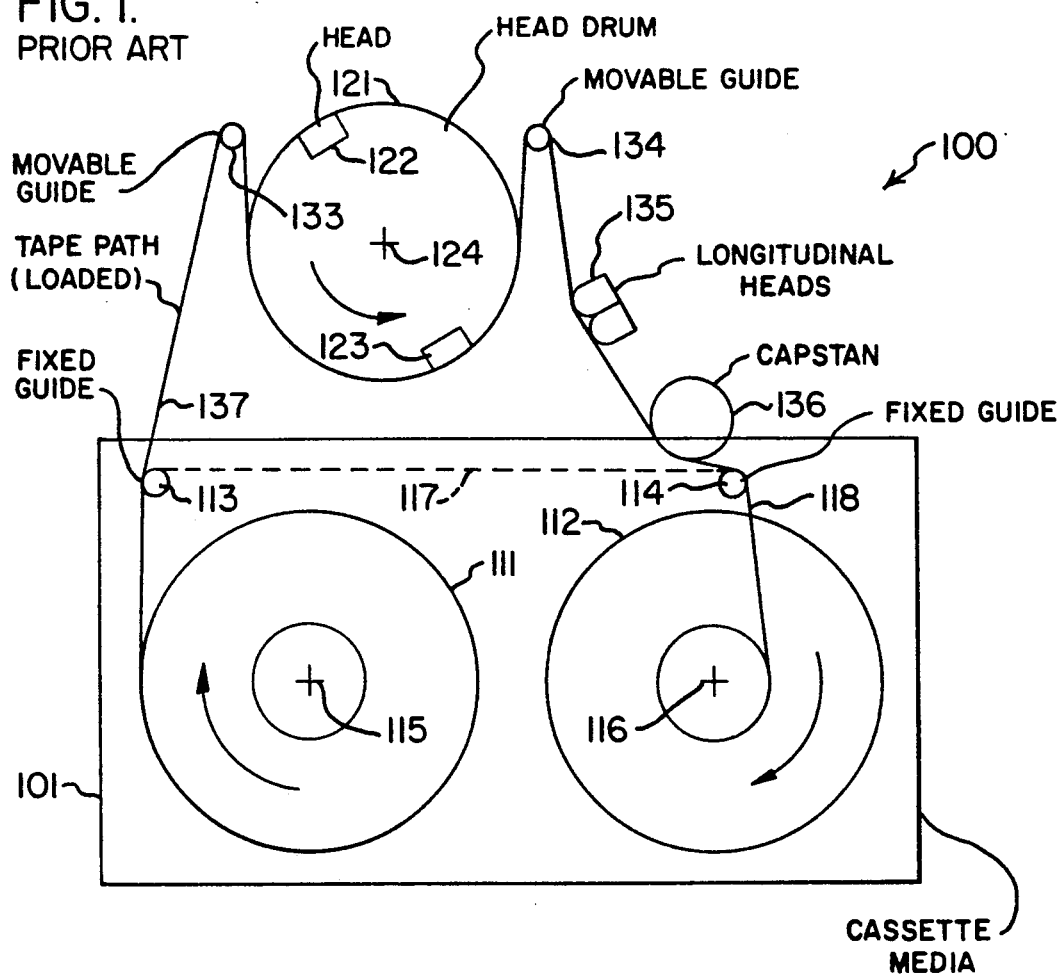
FIG. 1 illustrates, in block diagram form, the overall architecture of a typical prior art tape cassette helical scan transport.

FIG. 1 illustrates the architecture of a basic prior art helical scan tape cassette drive 100. A tape cassette 101 contains a pair of juxtaposed reels 111, 112 as the transport mechanism for magnetic tape 118. Each of reels 111, 112 is rotatably mounted on an associated spindle 115, 116, respectively, and rotates in a clockwise direction to transport the magnetic tape 118 from the supply reel 111 to the takeup reel 112. The tape cassette 101 includes a fixed guide 113 located adjacent to the supply reel 111 and another fixed guide 114 located adjacent to the takeup reel 112. Fixed guides 113, 114 are used to guide the positioning of magnetic tape 118. Dotted line path 117 indicates the placement of magnetic tape 118 in tape cassette 101 as it is placed into the helical scan tape transport 100. Fixed guides 113, 114 position magnetic tape 118 along path 117 so that it is accessible by the helical scan tape transport mechanism, to be retrieved from within tape cassette 101.

In well known fashion, when tape cassette 101 is loaded into the helical scan tape drive, a pair of moveable guides 133, 134 are activated to a first position wherein the magnetic tape 118, as placed on path 117, is located between the moveable guides 133, 134 and the rotary head 121. The moveable guides 133, 134 (or a vacuum) are operated to retrieve magnetic tape 118 from path 117 and transport magnetic tape 118 to wrap around rotary head 121 as illustrated in FIG. 1. Rotary head 121 is rotatable about spindle 124 and includes a pair of heads 122, 123 for reading and writing data onto the magnetic tape 118. The positioning of magnetic tape 118 as illustrated in FIG. 1 traverses a path 137 such that magnetic tape 118 extends from file reel 111, over fixed guide 113 of tape cassette 101, over moveable guide 133, rotary head 121, moveable guide 134, longitudinal heads 135, capstan 136 of the helical scan transport mechanism, and fixed guide 114 of tape cassette 101. When the tape is placed in this position, data can be written to or read from magnetic tape 118. The helical scan tape transport mechanism 100 illustrated in FIG. 1 is dependent on the use of tape cassette 101 that contains a pair of coplanar, juxtaposed reels 111, 112 having the magnetic tape 118 extending therebetween along path 117 so that the helical scan transport mechanism 100 can retrieve the magnetic tape 118 from tape cassette 101 to position the magnetic tape 118 along path 137 as illustrated in FIG. 1. It is obvious that this architecture is incompatible with the use of a single reel tape cartridge.

Figure 2:
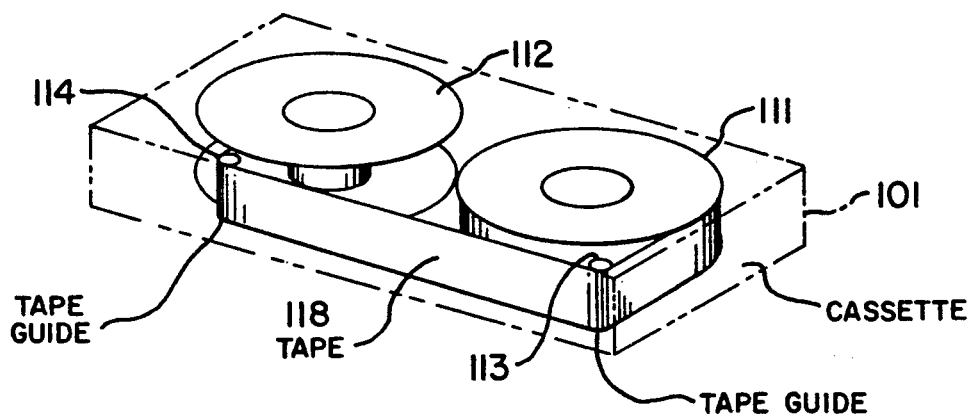
FIG. 2 illustrates, in perspective view, a typical prior art tape cassette.

FIG. 2 illustrates a perspective drawing of tape cassette 101 showing supply reel 111 and takeup reel 112 along with fixed guides 113, 114. Magnetic tape 118, as can be seen from this figure, extends from supply reel 111 to takeup reel 112 along one edge of tape cassette 101. Tape cassette 101 typically includes an access door (not shown) adjacent to magnetic tape 118 such that the helical scan tape transport can open the access door to access magnetic tape 118 located within tape cassette 101

Helical Magnetic Tape Cartridge

Figure 5:
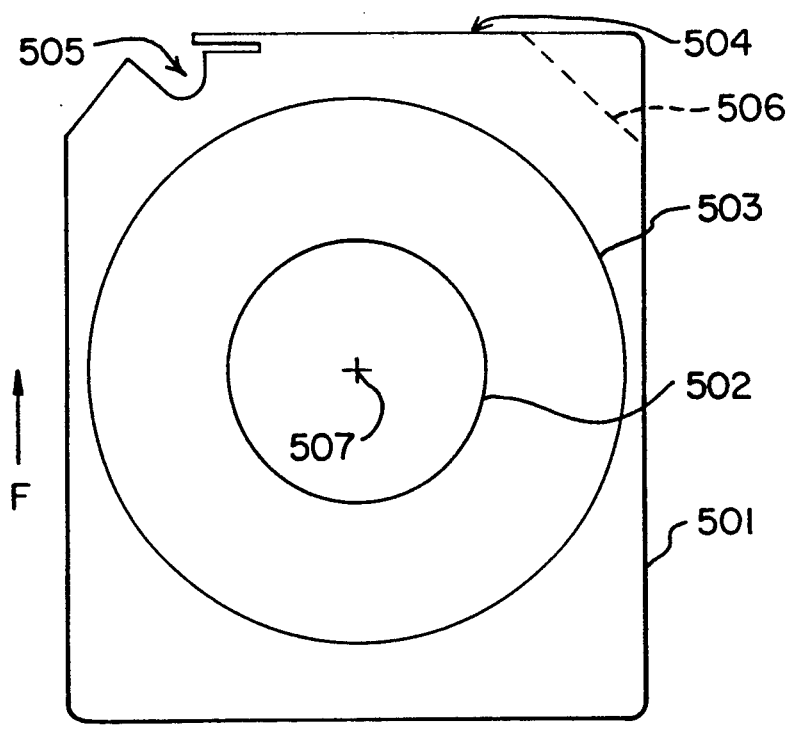
FIG. 5 illustrates details of the helical scan magnetic tape cartridge of the present invention.

FIG. 5 illustrates a top view of the helical scan magnetic tape cartridge of the present invention. The helical scan magnetic tape cartridge consists of an exterior housing 501 which has the exterior dimensions of a conventional 3480-type magnetic tape cartridge, which has a width of $4\frac{1}{4}$", a length of $4\frac{1}{4}$" and a height of 15/16" and encloses a single tape reel having a diameter of $3\frac{7}{8}$". The helical scan magnetic tape cartridge has a front side 504, which includes an opening through which a tape drive accesses the magnetic tape 503 contained therein. The helical scan magnetic tape cartridge is inserted into the tape drive in direction F, front side 504 first. As with the 3480-type magnetic tape cartridge, the helical scan magnetic tape cartridge contains a single supply reel 502 on which the magnetic tape 503 is wound in a clockwise direction. This direction of winding the magnetic tape 503 is the opposite of the conventional 3480-type magnetic tape cartridge. Furthermore, the recording surface of the magnetic tape 503 in the helical scan magnetic tape cartridge faces outward such that when the magnetic tape 503 traverses the tape threading path as described below, the recording surface of the magnetic tape 503 faces the read/write heads of the helical scan drive. A drive spindle 507 is attached to the bottom side of tape supply reel 502 to engage the supply reel drive mechanism in the tape drive as in conventional 3480-type drive systems.

As viewed from above as shown in FIG. 5, the helical scan magnetic tape cartridge includes an opening 505 in the left side of the front 504 of the cartridge through which the tape transport mechanism can access the magnetic tape 503. Access to magnetic tape 503 is provided in standard 3480-type fashion with a leader block (not shown) attached to one end of the magnetic tape 503 that is stored in the helical scan magnetic tape cartridge. The orientation, size and shape of the opening 505 in the end of the magnetic tape cartridge is analogous to that used in the 3480-type magnetic tape cartridge with the exception that this opening is on the opposite corner of the front side 504 of the magnetic tape cartridge as that found on the standard 3480-type magnetic tape cartridge. This differentiates the helical scan magnetic tape cartridge from the 3480-type magnetic tape cartridge in obvious fashion to enable an operator to recognize the difference between the helical scan magnetic tape cartridge and the 3480-type magnetic tape cartridge. In order to further distinguish the helical scan magnetic tape cartridge, the right front corner of the front 504 of the exterior housing 501 optionally can also be angled 506 in order to clearly distinguish this helical scan magnetic tape cartridge from conventional 3480-type magnetic tape cartridges.

Tape Drive Compatibility

By using this configuration, the helical scan magnetic tape cartridge is mechanically compatible with automated magnetic tape cartridge libraries such as the 4400 Automated Cartridge System manufactured by Storage Technology Corporation. Since helical tape can not be loaded in conventional 4480 or 3480 tape drives without damaging the tape during the load operation, the use of this differentiation described above automatically prevents the helical scan magnetic tape cartridge from threading in a conventional 4480 or 3480 magnetic tape drive since the leader block is positioned on the opposite side of the front of the magnetic tape cartridge. Furthermore, by placing the opening on the opposite corner, the helical scan magnetic tape cartridge provides a longer tape threading path in order to accurately emulate a magnetic tape cassette which is conventionally used with a helical scan tape drive. Furthermore, a standard 3480 or 4480 magnetic tape cartridge can not be threaded on a helical scan tape drive since the leader block is on the opposite side from that expected for a helical scan magnetic tape cartridge. Thus, the helical scan magnetic tape cartridge allows the use of standard 4400 ACS libraries to store and retrieve the cartridges since the exterior dimensions of the helical scan magnetic tape cartridge are identical to that of the 3480-type magnetic tape cartridge. Helical scan tape drives can be intermixed with conventional 3480 magnetic tape cartridge drives in a 4400 ACS library since both media have the same exterior form factor dimensions and the tape cartridges are not interchangeable therebetween due to the configuration differences described above with respect to the position of the leader block and the direction and orientation of the magnetic tape as wound the supply reel contained within the magnetic tape cartridge.

Virtual Tape Cassette

Figure 3:
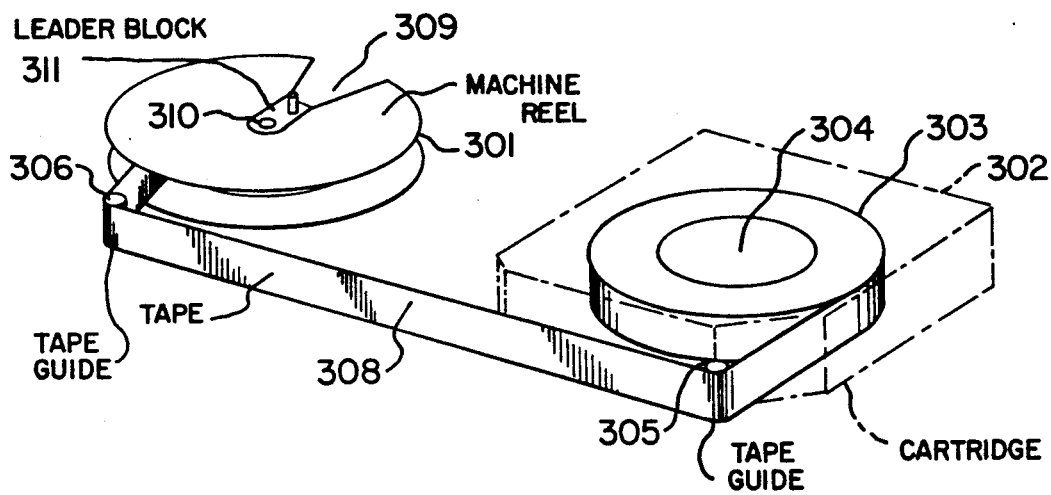
FIG. 3 illustrates, in perspective view, the orientation of the tape cartridge and takeup reel in the virtual tape cassette of the present invention.

FIG. 3 illustrates in perspective view, a typical virtual tape cassette that is implemented using the tape cartridge 302 of the present invention. In this configuration, a tape cartridge 302 containing a single supply reel 303 rotatably mounted on a spindle 304 is positioned substantially coplanar with and adjacent to takeup reel 301 to emulate one type of tape cassette. Tape cartridge 302 contains a length of magnetic tape 308 stored therein and wound in a clockwise direction around spindle 304. At one end of magnetic tape 308 is affixed a leader block 311 which is used by a typical tape cartridge transport to retrieve a length of magnetic tape 308 from tape cartridge 302 and thread the magnetic tape 308 along a tape threading path to the slot 309 in takeup reel 01 which is configured to receive leader block 311. The magnetic tape is wound in magnetic tape cartridge 302 in the reverse orientation to conventional 3480-type magnetic tape cartridges such that the recording surface of the magnetic tape faces outward. Takeup reel 301 is rotatably mounted on a spindle 310. A pair of fixed guides 305, 306 are provided in the configuration illustrated in FIG. 3 in order to position magnetic tape 308 in a manner that is analogous to that illustrated in FIG. 2 for the tape cassette 101. The virtual tape cassette of FIG. 3 provides substantially the same configuration of supply reel 303 and takeup reel 301 as that of tape cassette 101 illustrated in FIG. 2. The positioning of tape cartridge 302 matches that used in tape cartridge drives so that loading and unloading of tape cartridge 302 from the cartridge drive of the present invention is substantially the same as that used in standard tape cartridge drives. It is obvious that another virtual tape cassette that can be similarly emulated in the two reel coaxial tape cassette using a slightly different tape threading mechanism.

Tape Cartridge Handling Mechanism for Helical Scan Drive

Figure 4:
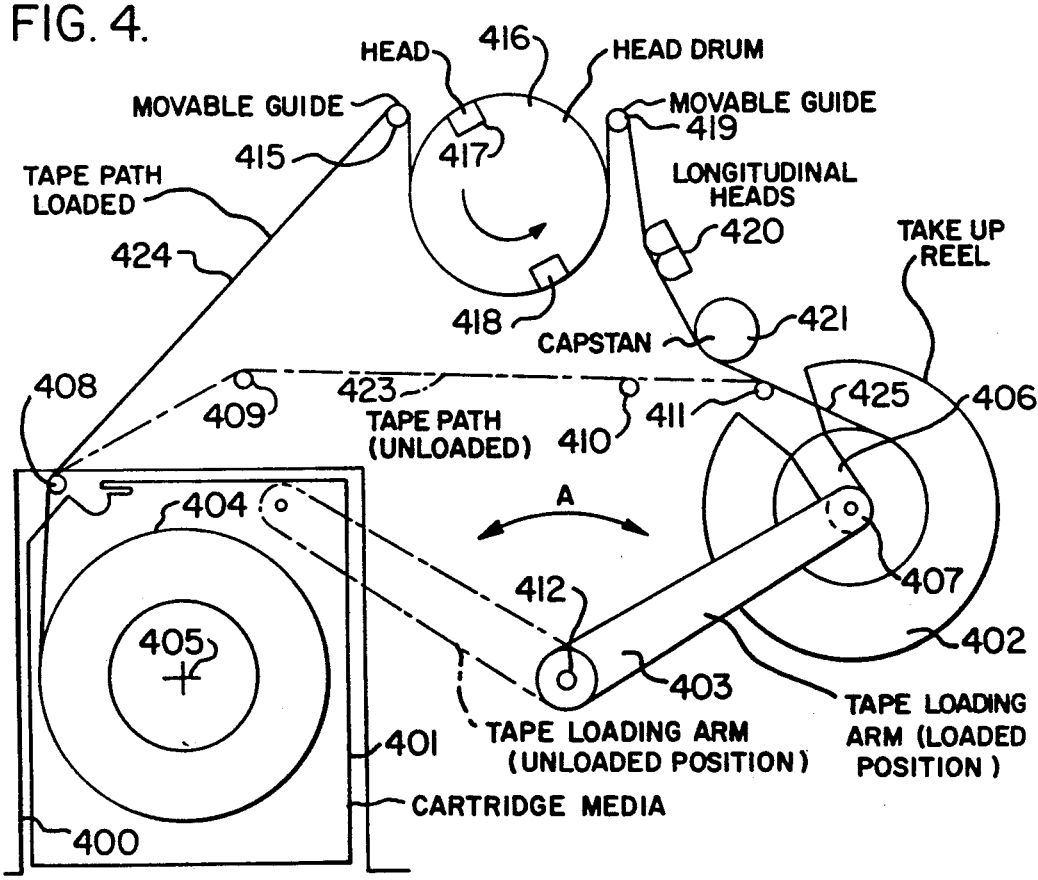
FIG. 4 illustrates the architecture of one embodiment of the apparatus of the present invention, using a helical scan tape transport with the helical scan magnetic tape cartridge.

FIG. 4 illustrates the architecture of a tape cartridge handling mechanism for use with a helical scan tape transport. The tape transport illustrated in FIG. 4 is identical to that illustrated in FIG. 1. The virtual tape cassette is implemented using cartridge 401 which contains a source reel 404 rotatably mounted on spindle 405. Tape cartridge 401 is loaded into a receiving mechanism 400 which includes a plurality of elements not illustrated in FIG. 4 for simplicity purposes including: a drive motor, servo mechanism, eject mechanism, etc. A takeup reel 402 and tape threading mechanism, such as tape threading arm 403 are provided to transform tape cartridge 401 into a virtual tape cassette. Tape cartridge 401 when positioned in a receiver 400 is substantially coplanar with and located adjacent to takeup reel 402. In addition, rotary head 416 is typically substantially coplanar with and adjacent to tape cartridge 401 and takeup reel 402. In order to optimize the contact between magnetic tape 425 and rotary head 416, it may be advantageous to orient the takeup reel 402 so it is not coplanar with the tape cartridge 401. In this configuration, the magnetic tape 425 follows an angled path from tape cartridge 401 to rotary head 416 to takeup reel 402.

In the system illustrated in FIG. 4, a plurality of fixed guides 408, 411 are provided to position the magnetic tape 425 along a tape path 423 which emulates a tape path used in a tape cassette. In operation, tape threading arm 403 is pivotally attached to spindle 412 and operates by swinging in the arc illustrated by arrow A to grasp leader block 407 from tape cartridge 401 and thread magnetic tape 425 along path 423 to takeup reel 402 where leader block 407 is inserted into slot 406. Tape threading arm 403 positions magnetic tape 425 along fixed guides 408, 411 as it traverses its path.

The second step in the tape loading operation is the tape wrap process which transports the magnetic tape to contact the rotary head 416. The positioning of magnetic tape 425 along path 423 enables one or more moveable guides 415, 419 of the tape wrap mechanism, when in a first position (indicated by 409, 410), located such that tape path 423 is between moveable guides 415, 419 and rotary head 416, to grasp magnetic tape 425 on the backside thereof and transport magnetic tape 425 from tape path 423 to tape path 424 as illustrated in FIG. 4. Magnetic tape 425 is wrapped around rotary head 416 by one or more moveable guides 415, 419 as described above with respect to the helical scan tape transport mechanism of FIG. 1. By contacting the back surface of magnetic tape 425, moveable guides 415, 419 guide magnetic tape 425 into position in the tape loaded path 424 without causing wear on the recording surface of magnetic tape 425.

Thus, the mechanism illustrated in FIG. 4 operates in a two step process. The first step consists of tape threading arm 403 grasping the leader block 407 once the tape cartridge 401 is inserted into the receiver 400 and threading magnetic tape 425 along tape path 423 to takeup reel 402. Once this first operation is completed, then the helical scan tape transport mechanism can transport the magnetic tape 425 from path 423 to path 424 where it is helically wrapped around rotary head 416.

Conventional Tape Cartridqe Mechanism

Figure 6:
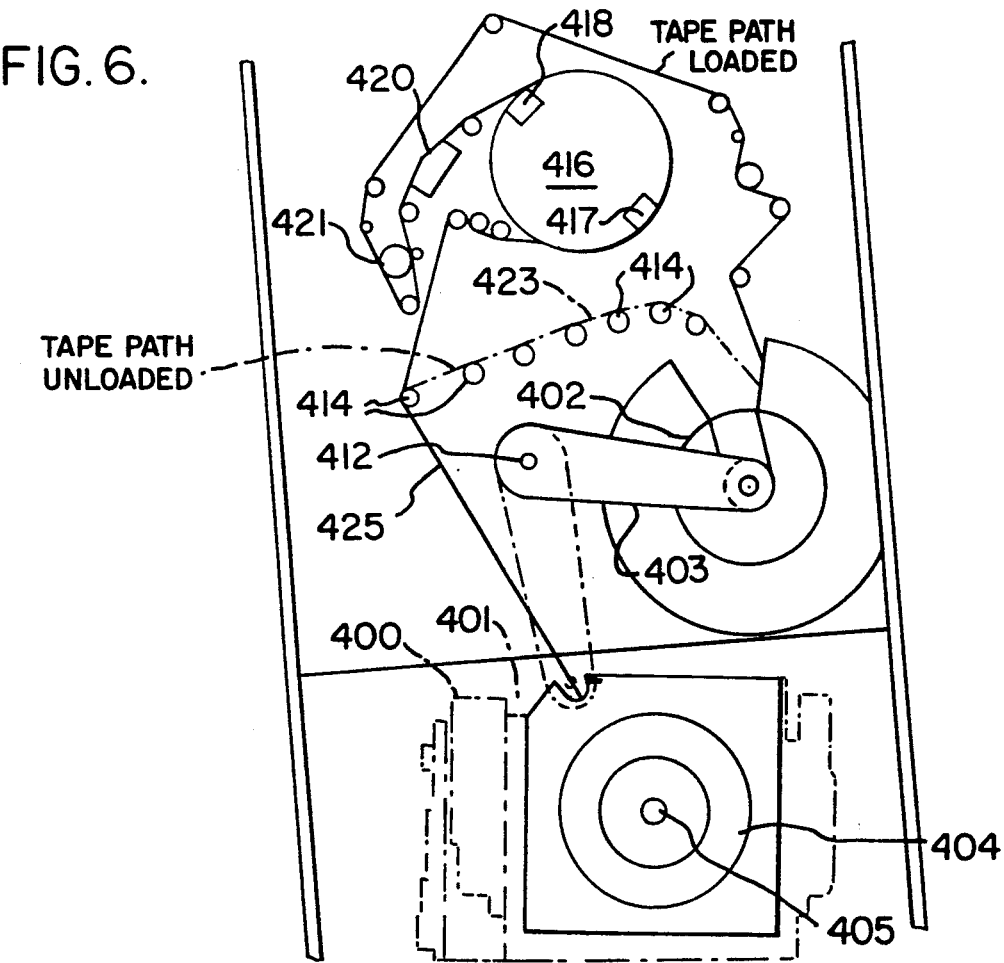
FIG. 6 and 7 illustrate the architecture of alternate embodiments of the apparatus of the present invention, using a helical scan tape transport with the helical scan magnetic tape cartridge.
Figure 7:
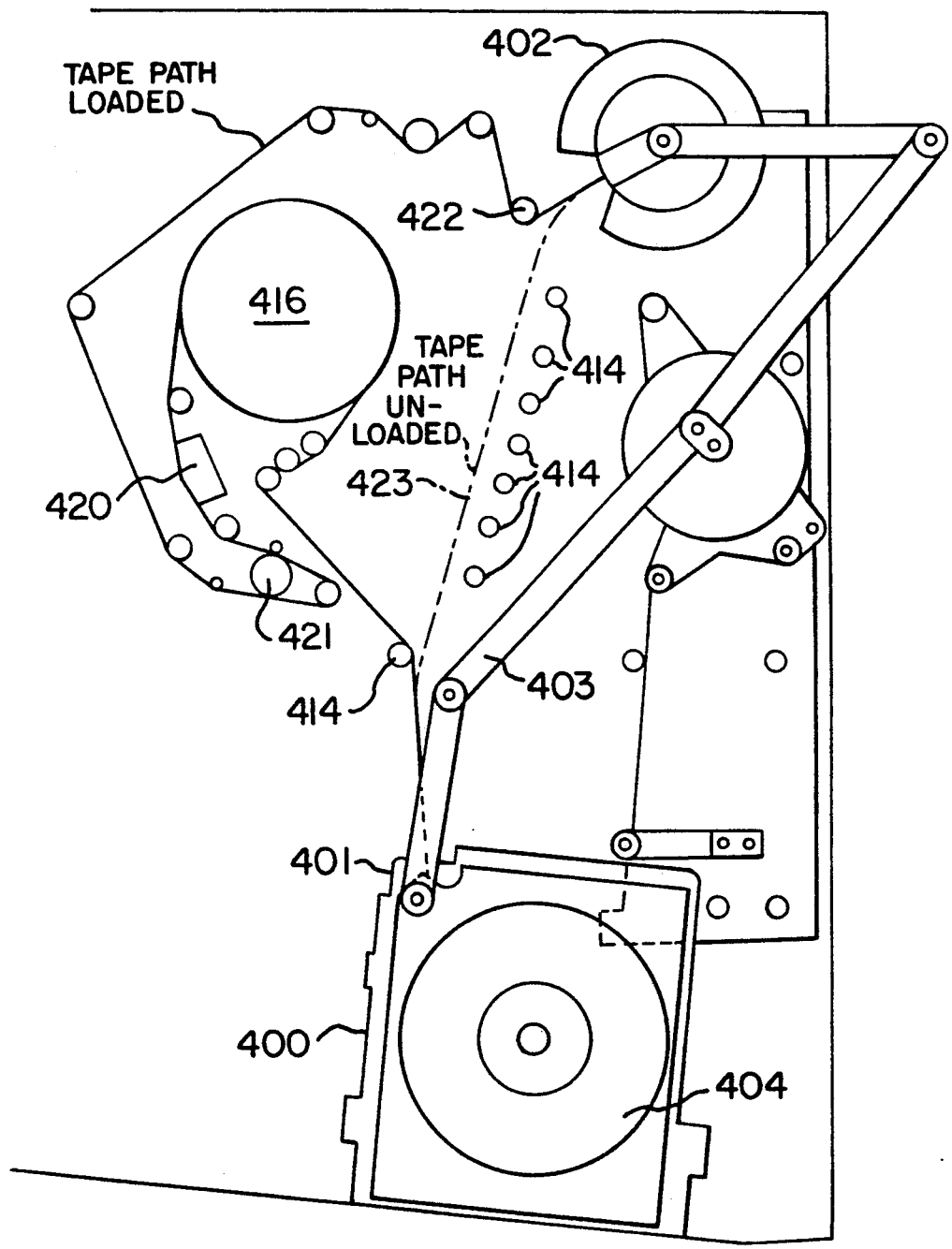

FIGS. 6 and 7 illustrate the implementation of the tape cartridge apparatus for helical scan tape transports using a conventional tape cartridge mechanism. This mechanism consists of a tape cartridge receiver 400 which receives tape cartridge 401. Takeup reel 402 is located adjacent to tape cartridge 401 (in FIG. 6 and displaced therefrom in FIG. 7) and includes the leader block slot 406. Tape threading arm 403 is provided to grasp the leader block 407 on magnetic tape 425 and thread magnetic tape 425 along tape threading path 423, which includes fixed guides 414, 422, to insert the leader block into slot 406 of takeup reel 402. Once the magnetic tape 425 is positioned along tape threading path 423, the tape wrap mechanism, in the form of moveable guides 415, 416, 421 of the helical scan mechanism, are moveable to appropriately position magnetic tape 425 on rotary head 416. In this mechanism, the standard tape cartridge drive mechanism has been adapted by removing the read/write head unit therefrom and replacing it with a helical scan tape loading mechanism. In addition, the tape threading path has been significantly simplified since a complex tape threading path is not required. In fact, the two step process described above can be modified using this mechanism to enable the helical scan loading mechanism to begin transporting the magnetic tape 425 from tape loading path 423 to the rotary head 416 once the tape threading arm 403 has traversed tape loading path 423 and is positioned past fixed guide 422. The magnetic tape 425 is properly positioned for loading onto rotary head 416 once this segment of the tape loading path 423 has been traversed by tape threading arm 403. An additional tension will be placed on magnetic tape 425 by the operation of the helical scan tape loading mechanism but this is easily compensated for by the servo mechanism on tape threading arm 403 such that the completion of the tape threading operations is concurrent with transporting of the magnetic tape 425 to the rotary head 416.

While a specific embodiment of this invention has been disclosed, it is expected that those skilled in the art can and will design alternate embodiments of this invention that fall within the scope of the appended claims.

I claim:

1. A magnetic tape cartridge comprising:
    a substantially rectangular exterior housing having a top side, a bottom side and a front side thereto for enclosing a single reel of magnetic tape rotatably mounted within said exterior housing, said exterior housing being directly mountable in a tape drive equipped with a fixed takeup reel and a tape threading arm that extracts said magnetic tape from said exterior housing for threading onto said takeup reel, said tape having a recording surface facing outward when said magnetic tape is wound on said single reel.
    a drive spindle affixed coaxially to said single reel on said bottom side of said exterior housing for providing a mechanical coupling of said single reel to a tape drive in which said magnetic tape cartridge is mounted;
    slot means located in said front side of said exterior housing, on the left side thereof as said magnetic tape cartridge is viewed from said top side to provide access to said magnetic tape to said tape threading arm.

2. The magnetic tape cartridge of claim 1 wherein said exterior housing substantially has the exterior dimensions of a 3480-type magnetic tape cartridge.

3. The magnetic tape cartridge of claim 1 wherein said magnetic tape comprises helical scan formatted magnetic tape having a recording surface facing outward when said magnetic tape is wound on said single reel.

4. The magnetic tape cartridge of claim 1 wherein said exterior housing further includes an angled corner of the right side of said front side as said magnetic tape cartridge is viewed from said top side thereof.

5. The magnetic tape cartridge of claim 1 wherein said magnetic tape is wound in a clockwise direction around said single reel as said magnetic tape cartridge is viewed from said top side.

6. A magnetic tape cartridge comprising:
    an exterior housing substantially having the exterior dimensions of a 3480-type magnetic tape cartridge and having a top side, a bottom side and a front side thereto for enclosing a single reel of magnetic tape, said exterior housing being directly mountable in a tape drive equipped with a fixed takeup reel and a tape threading arm that extracts said magnetic tape from said exterior housing for threading onto said takeup reel;
    a single reel of magnetic tape rotatably mounted within said exterior housing, said magnetic tape being wound thereon in a clockwise direction, as said magnetic tape cartridge is viewed from said top side thereof, and having a recording surface facing outward when said magnetic tape is wound on said single reel;

leader block means affixed to an end of said magnetic tape and graspable by said tape threading arm;

a drive spindle affixed coaxially to said single reel on said bottom side of said exterior housing for providing a mechanical coupling of said single reel to a tape drive in which said magnetic tape cartridge is mounted;

slot means located in said front side of said exterior housing, on the left side thereof when said magnetic tape cartridge is viewed from said top side, for receiving said leader block means.

7. The magnetic tape cartridge of claim 6 wherein said magnetic tape comprises helical scan formatted magnetic tape.

8. The magnetic tape cartridge of claim 6 wherein said exterior housing further includes an angled corner of the right side of said front side as said magnetic tape cartridge is viewed from said top side thereof.

9. A magnetic tape cartridge comprising:
a substantially rectangular exterior housing having a top side, a bottom side and a front side thereto;
a single reel of magnetic tape rotatably mounted within said exterior housing said magnetic tape being wound on said single reel in a clockwise direction as said magnetic tape cartridge is viewed from said top side and having a recording surface facing outward when said magnetic tape is wound on said single reel;

said exterior housing being directly mountable in a tape drive equipped with a fixed takeup reel and a tape threading arm that extracts said magnetic tape from said exterior housing for threading onto said takeup reel;

leader block means affixed to an end of said magnetic tape and graspable by said tape threading arm;

drive spindle means affixed coaxially to said single reel on said bottom side of said exterior housing for providing a mechanical coupling of said single reel to a tape drive in which said magnetic tape cartridge is mounted;

slot means located in said front side of said exterior housing, on the left side thereof as said magnetic tape cartridge is viewed from said top side, for receiving said leader block means.

10. The magnetic tape cartridge of claim 9 wherein said exterior housing substantially has the exterior dimensions of a 3480-type magnetic tape cartridge.

11. The magnetic tape cartridge of claim 9 wherein said exterior housing further includes an angled corner of the right side of said front side as said magnetic tape cartridge is viewed from said top side thereof.

* * * * *